US011536967B2

(12) United States Patent
Miyao et al.

(10) Patent No.: US 11,536,967 B2
(45) Date of Patent: Dec. 27, 2022

(54) LIGHT-GUIDING DEVICE, DISPLAY DEVICE, AND METHOD OF MANUFACTURING LIGHT-GUIDING DEVICE

(71) Applicant: SEIKO EPSON CORPORATION, Tokyo (JP)

(72) Inventors: Toshiaki Miyao, Chino (JP); Masayuki Takagi, Azumino (JP); Tokito Yamaguchi, Azumino (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 232 days.

(21) Appl. No.: 17/082,023

(22) Filed: Oct. 28, 2020

(65) Prior Publication Data

US 2021/0132389 A1  May 6, 2021

(30) Foreign Application Priority Data

Oct. 31, 2019  (JP) .............................. JP2019-198380

(51) Int. Cl.
*G02B 27/01* (2006.01)
*G02B 1/14* (2015.01)
*G06F 1/16* (2006.01)

(52) U.S. Cl.
CPC .......... *G02B 27/0172* (2013.01); *G02B 1/14* (2015.01); *G06F 1/1609* (2013.01); *G02B 2027/0178* (2013.01)

(58) Field of Classification Search
CPC .............. G02B 1/14; G02B 2027/0178; G02B 27/0172; G02B 27/017; G02B 27/01; G06F 1/1609

USPC .......................................................... 359/629
See application file for complete search history.

(56) References Cited

U.S. PATENT DOCUMENTS

| | | | |
|---|---|---|---|
| 2008/0239422 A1* | 10/2008 | Noda ................. | G02B 27/0172 359/13 |
| 2012/0200937 A1 | 8/2012 | Totani et al. | |
| 2013/0335828 A1 | 12/2013 | Totani et al. | |
| 2016/0154243 A1 | 6/2016 | Aiki | |
| 2016/0238758 A1* | 8/2016 | Turpen ..................... | G02B 1/14 |
| 2016/0306174 A1 | 10/2016 | Totani et al. | |
| 2017/0299871 A1 | 10/2017 | Totani et al. | |
| 2018/0335628 A1* | 11/2018 | Hung ....................... | G02B 6/00 |
| 2020/0192095 A1* | 6/2020 | Puetz ................ | G02B 27/0172 |
| 2020/0319459 A1* | 10/2020 | Amitai ................... | G02B 27/10 |
| 2020/0326545 A1* | 10/2020 | Amitai ................. | G02B 6/0065 |
| 2021/0294099 A1* | 9/2021 | Anzai .................... | B60K 35/00 |

FOREIGN PATENT DOCUMENTS

| | | |
|---|---|---|
| CN | 102628988 | 8/2012 |
| CN | 104755994 | 7/2015 |
| JP | 2009145513 | 7/2009 |

* cited by examiner

*Primary Examiner* — William R Alexander
(74) *Attorney, Agent, or Firm* — JCIPRNET

(57) ABSTRACT

A light-guiding device is configured to accept image light through a light incidence part, guide the image light through reflection, and emit, to outside through a light emission part, the image light that is guided, the light-guiding device includes a protective member having a sheet shape and configured to cover a body member in a region corresponding to an optical surface of a surface of the light-guiding device, and an adhesive layer is formed between the body member and the protective member.

13 Claims, 11 Drawing Sheets

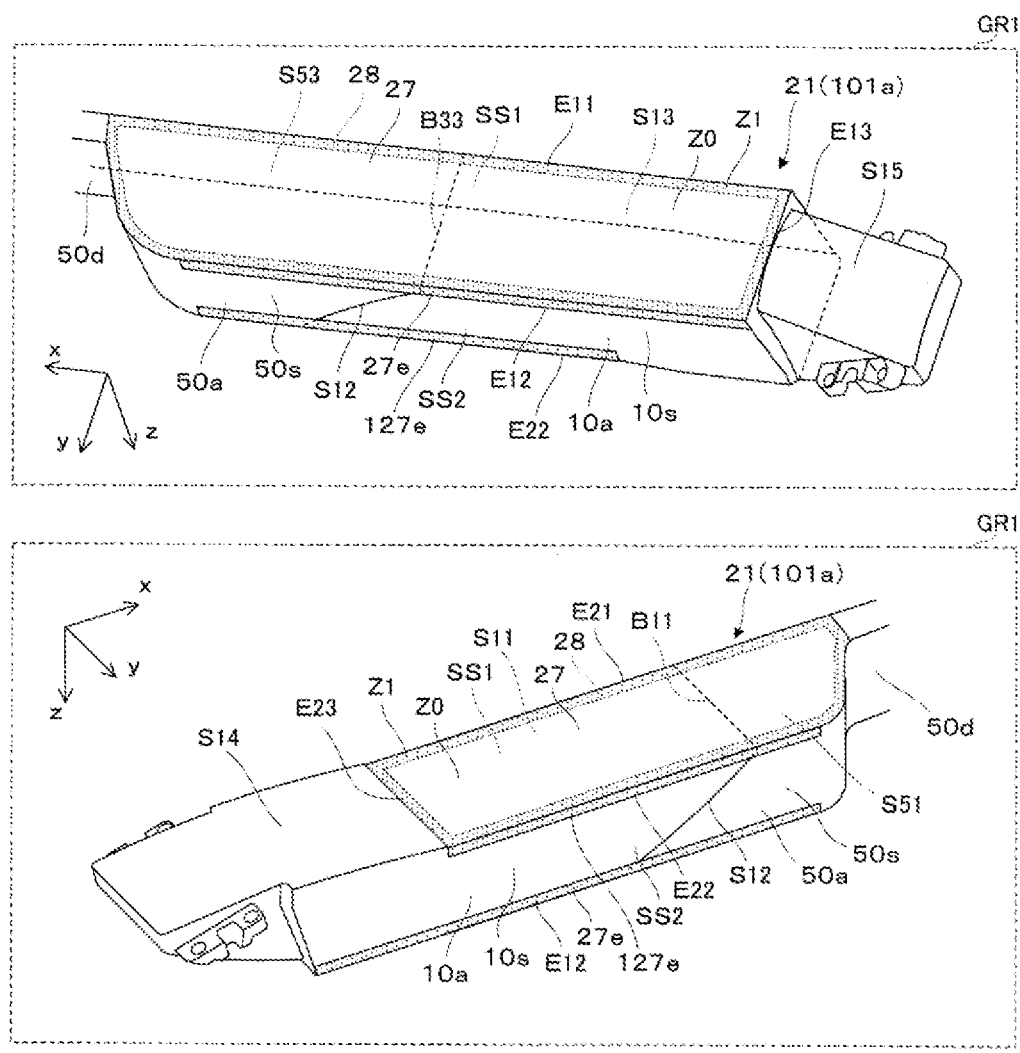
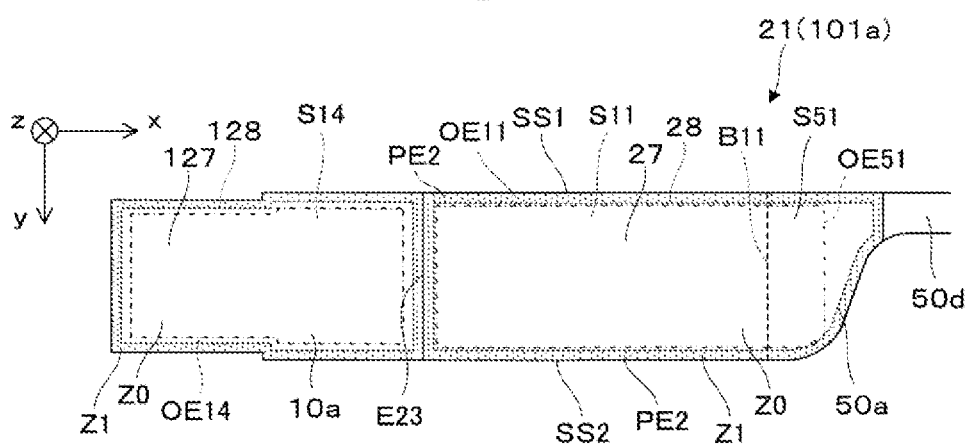
FIG. 14
FIG. 15

LIGHT-GUIDING DEVICE, DISPLAY DEVICE, AND METHOD OF MANUFACTURING LIGHT-GUIDING DEVICE

The present application is based on, and claims priority from JP Application Serial Number 2019-198380, filed Oct. 31, 2019, the disclosure of which is hereby incorporated by reference herein in its entirety.

BACKGROUND

1. Technical Field

The present disclosure relates to a light-guiding device, a display device, and a method of manufacturing the light-guiding device for forming a virtual image to be observed by an observer, and particularly relates to a light-guiding device and the like that achieve see-through viewing.

2. Related Art

A display device is known that includes a display element, an ocular prism, and a deflection prism in which a hologram element is disposed between the ocular prism and the deflection prism such that an image formed on the display element can be observed through the ocular prism and the hologram element (JP-A-2009-145513). In this display device, a protective substrate is disposed opposite a total reflection surface of a light-guiding plate composed of the ocular prism and the deflection prism so as to form an air layer, and the protective substrate is supported on the light-guiding plate by a support member.

In the display device of JP-A-2009-145513, there is almost no disclosure about a specific structure and the like of the support member disposed between the protective substrate and the light-guiding plate, and the protective substrate may be peeled from the light-guiding plate due to the influence of heat and humidity.

SUMMARY

A light-guiding device according to one aspect of the present disclosure is configured to accept image light through a light incidence part, guide the image light through reflection, and emit, to outside through a light emission part, the image light that is guided, the light-guiding device including a protective member having a sheet shape and configured to cover a body member in a region corresponding to an optical surface of a surface of the light-guiding device. An adhesive layer is formed between the body member and the protective member.

BRIEF DESCRIPTION OF THE DRAWINGS

FIG. 14 is a perspective view illustrating a display device of a third embodiment.

FIG. 15 is a back view illustrating a display device of a fourth embodiment.

DESCRIPTION OF EXEMPLARY EMBODIMENTS

First Embodiment

A light-guiding device and a display device including the light-guiding device according to a first embodiment of the present disclosure are described below with reference to the accompanying drawings.

Figure 1:
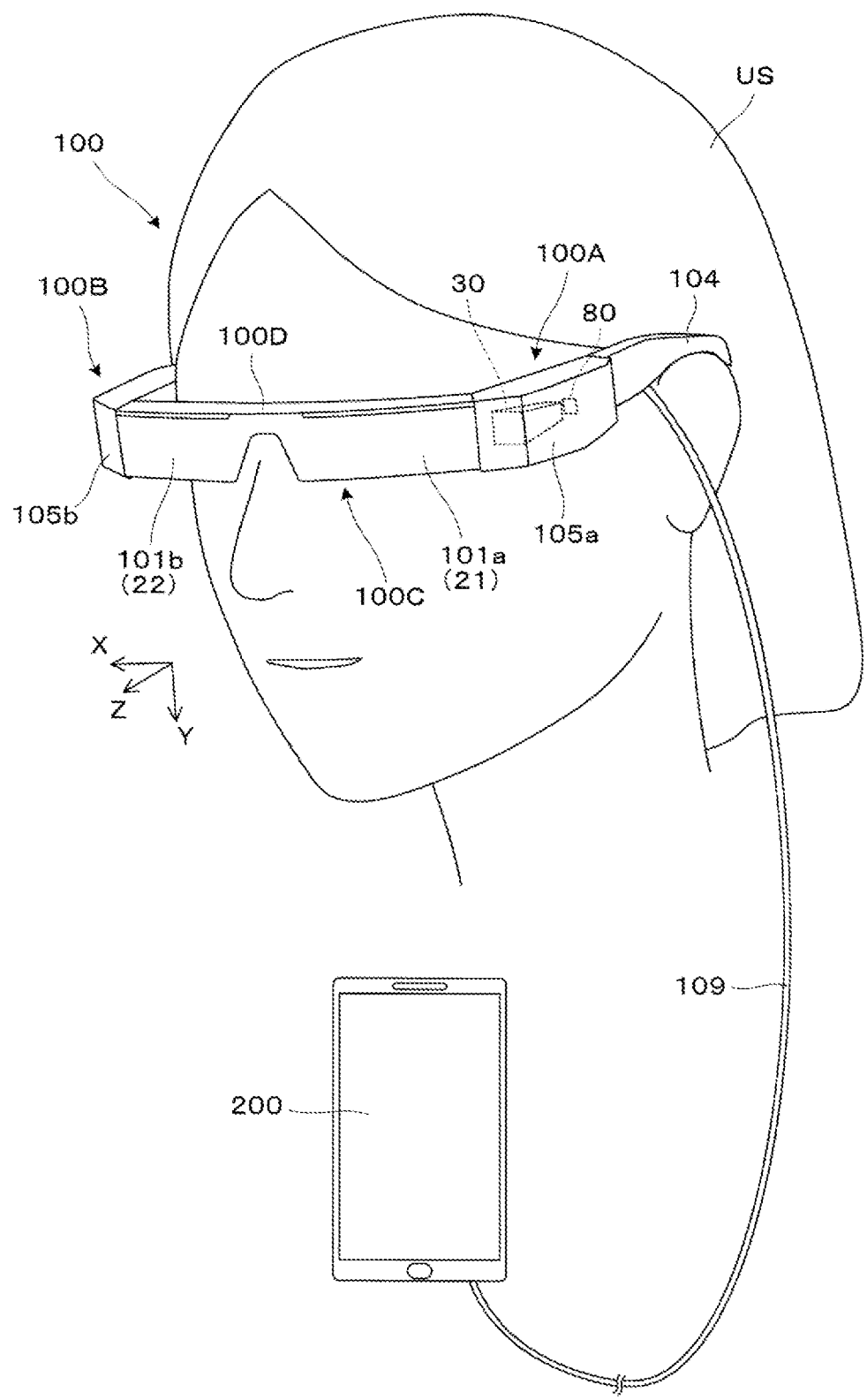
FIG. 1 is a perspective view illustrating a state where a display device according to a first embodiment is used.

With reference to FIG. 1, a display device 100 including a light-guiding device of the embodiment is a head-mounted display (HMD) having an eyeglass-like appearance. In FIG. 1, X, Y, and Z are a rectangular coordinate system, in which the +X direction corresponds to a lateral direction in which both eyes of an observer wearing the display device 100 are aligned, the +Y direction corresponds to an downward direction orthogonal to the lateral direction in which both eyes of the observer are aligned, and the +Z direction corresponds to a forward direction or a front direction with respect to the observer.

The display device 100 can achieve not only visual recognition of a virtual image, but also observation of an external image in a see-through manner for an observer or wearer US wearing the display device 100. The display device 100 can be communicatively connected to an external device 200 such as a smartphone through a cable 109, and can form a virtual image corresponding to an image signal input from the external device 200, for example. The display device 100 includes a first display device 100A and a second display device 100B. The first display device 100A and the second display device 100B are parts that form a virtual image for the left eye and a virtual image for the right eye, respectively.

The first display device 100A for the left eye includes a first virtual image forming optical part 101a that covers the front of the eye of the wearer US in a see-through viewable manner and emits image light as a first light-guiding device 21, and a first image forming body part 105a that forms image light that enters the first virtual image forming optical part 101a. The second display device 100B for the right eye includes a second virtual image forming optical part 101b that covers the front of the eye of the wearer US in a see-through viewable manner and emits image light as a second light-guiding device 22, and a second image forming body part 105b that forms image light that enters the second virtual image forming optical part 101b. The virtual image forming optical parts 101a and 101b include a light guide formed of a resin material or the like, and the image forming body parts 105a and 105b house optical components and electronic components in outer cases formed of a magnesium alloy or the like.

Temples 104, which are temple parts extending rearward from the sides of the head, are pivotably attached to the rear portions of the first and second image forming body parts 105a and 105b by hinges (not illustrated). The temples 104 make contact with the ears, temples, and the like of the wearer US to ensure the wearing state of the display device 100. Although not illustrated in the drawing, a nose pad that forms a support part together with the temple 104 is provided in a recess formed between the first and second virtual image forming optical parts 101a and 101b, and this nose pad enables positioning of the virtual image forming optical parts 101a and 101b, i.e., the light-guiding devices 21 and 22 with respect to the eye of the wearer US.

Figure 2:
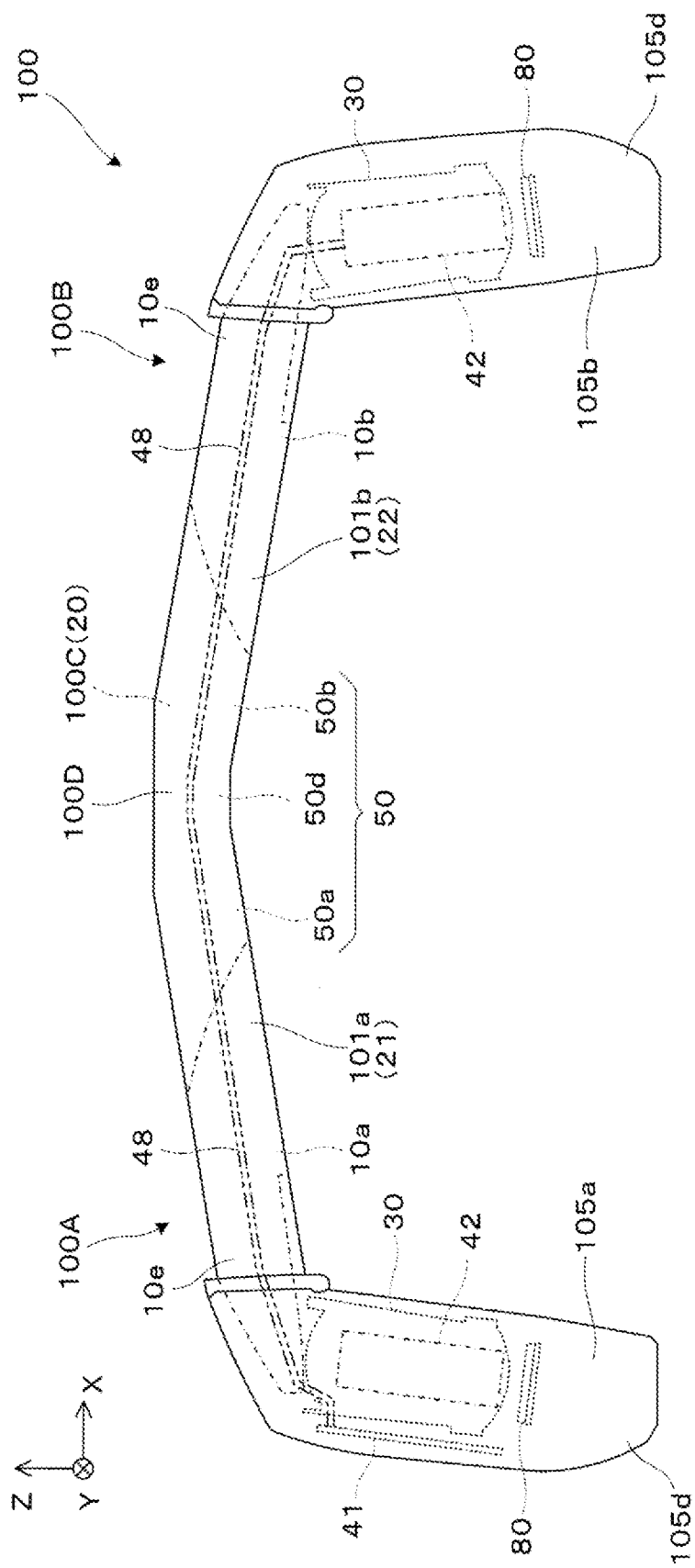
FIG. 2 is a plan view illustrating a main part of the display device.

An internal structure of the display device 100 and the like are described with reference to FIG. 2. The first image forming body part 105a includes a display element 80, a projection lens 30, electronic circuit boards 41 and 42, and the like in a cover-shaped outer case 105d. The projection lens 30, the display element 80, and the electronic circuit boards 41 and 42 are supported in the outer case 105d made of a metal. Among them, the projection lens 30 is fixed in the state where the projection lens 30 is aligned with respect to an end portion 10e of the first virtual image forming optical part 101a, and the display element 80 is fixed in the state where the display element 80 is aligned with respect to the projection lens 30. The second image forming body part 105b includes the display element 80, the projection lens 30, the electronic circuit board 42, and the like in the cover-shaped outer case 105d. The projection lens 30, the display element 80, and the electronic circuit board 42 are supported in the outer case 105d made of a metal. Among them, the projection lens 30 is fixed in the state where the projection lens 30 is aligned with respect to the end portion 10e of the second virtual image forming optical part 101b, and the display element 80 is fixed in the state where the display element 80 is aligned with respect to the projection lens 30.

In the first image forming body part 105a for the left eye, the display element 80 is a display device that forms an image corresponding to a virtual image for the right eye. The projection lens 30 is disposed upstream of the first virtual image forming optical part 101a with respect to the optical path, and constitutes a part of the imaging system. The electronic circuit board 41 is a signal processing board that processes a signal from the external device 200 illustrated in FIG. 1. The electronic circuit board 41 manages and controls the display operation of the electronic circuit board 42. The electronic circuit board 42 is a drive circuit board that drives the display element 80 in the first image forming body part 105a, and operates under control of the electronic circuit board 41.

In the second image forming body part 105b for the right eye, the display element 80 is a display device that forms an image corresponding to a virtual image for the right eye. The projection lens 30 is disposed upstream of the second virtual image forming optical part 101b with respect to the optical path, and constitutes a part of the imaging system. The second image forming body part 105b does not include a member corresponding to the electronic circuit board 41 provided in the first image forming body part 105a. In the first image forming body part 105a, the electronic circuit board 42 is a drive circuit board that drives the display element 80 in the second image forming body part 105b. The electronic circuit board 42 operates in accordance with a signal output from the electronic circuit board 41 provided in the first image forming body part 105a.

The display element 80 incorporated in the first image forming body part 105a and the second image forming body part 105b is a self-luminous display device that enables two-dimensional display, and operates in a dot-matrix manner. The display element 80 can be driven by the electronic circuit board 42 to form a color image on a square display surface and can display a two-dimensional video or still image.

The first and second virtual image forming optical parts 101a and 101b are not separate members, but are coupled at the center to form a see-through light-guiding unit 100C, which is an integral member. The see-through light-guiding unit 100C includes a pair of light-guiding members 10a and 10b and a central member 50. The pair of light-guiding members 10a and 10b are a pair of optical members that contribute to image formation by propagating image light therein. In other words, the light-guiding members 10a and 10b guide, toward the eye of the wearer US, light emitted from the display element 80. The central member 50 includes a pair of light transmission parts 50a and 50b. The light transmission part 50a on one side is joined to the light-guiding member 10a on one side, and the light transmission part 50b on the other side is joined to the light-guiding member 10b on the other side. The light transmission parts 50a and 50b are coupled with a bridge part 50d therebetween. The see-through light-guiding unit 100C is a composite light-guiding device 20 that provides images for both eyes of the observer or wearer US by means of light guidance, and the see-through light-guiding unit 100C is supported by the outer case 105d at both end portions, i.e., on the end portion 10e side of the light-guiding members 10a and 10b.

An upper cover 100D is fixed to the top surface of the see-through light-guiding unit 100C. A thin and narrow space is formed between the upper cover 100D and the see-through light-guiding unit 100C, and a signal line 48 extends therein. The signal line 48 electrically couples the first image forming body part 105a and the second image forming body part 105b.

Figure 3:
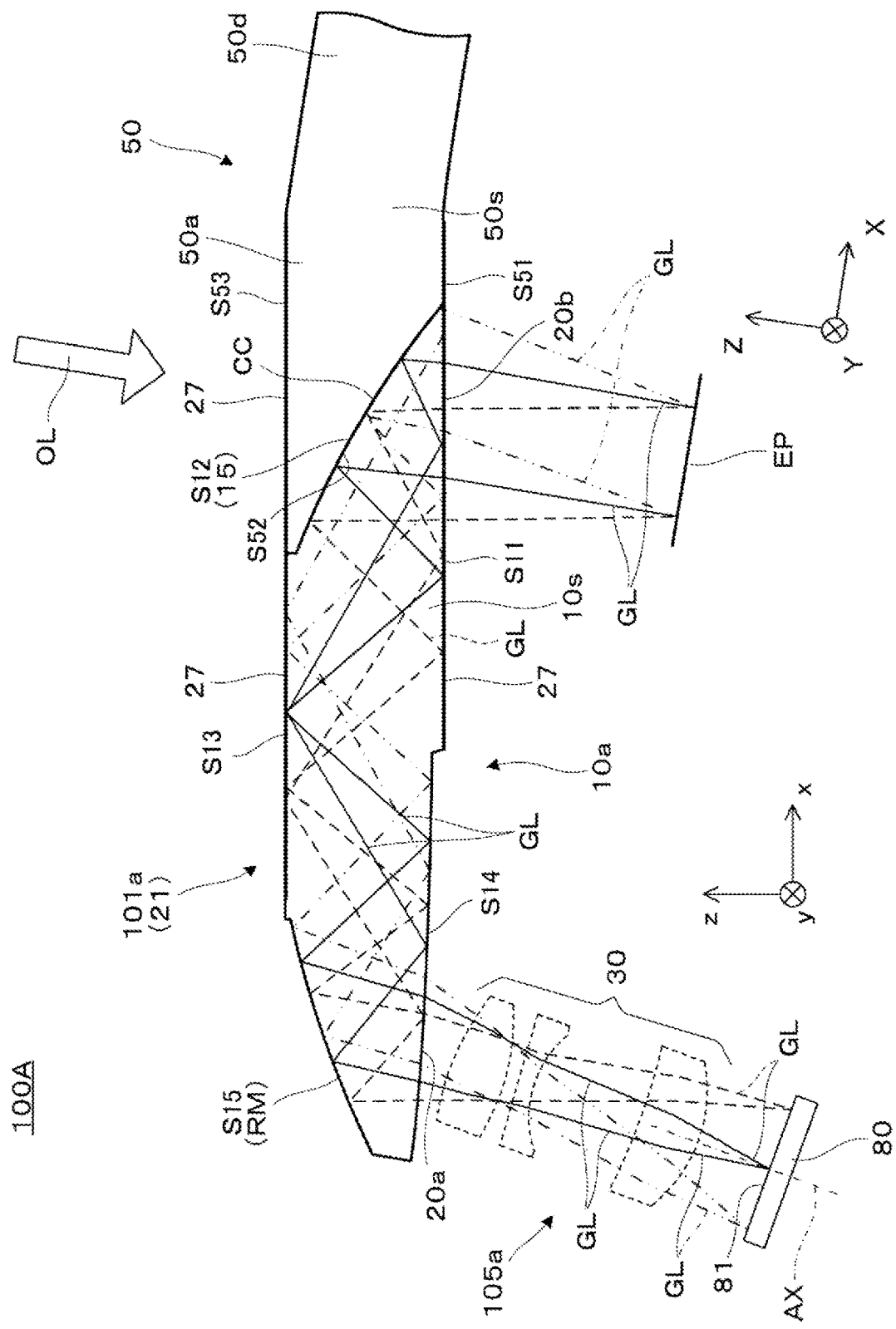
FIG. 3 is a plan view illustrating an optical structure of a first virtual image forming optical part.

FIG. 3 is a diagram illustrating a portion of the first display device 100A, and mainly describes an optical structure of the first virtual image forming optical part 101a, i.e., the first light-guiding device 21. As described above, the display device 100 is composed of the first display device 100A and the second display device 100B (see FIG. 1), but the first display device 100A and the second display device 100B have equivalent structures that are symmetric in the left-right direction. Therefore, only the first display device 100A is described and description of the first display device 100A is omitted. Note that in FIG. 3, x, y, and z are a rectangular coordinate system, in which the x-direction and the y-direction are parallel to a first surface S11 and a third surface S13, and the z-direction is perpendicular to the first surface S11 and the third S13 surface.

The first light-guiding device 21 includes the light-guiding member 10a and the light transmission part 50a, and the light-guiding member 10a is joined to and integrated with the light transmission part 50a with an adhesive layer CC therebetween. The first light-guiding device 21 includes, in the light-guiding member 10a, a light incidence part 20a from which image light GL enters the light-guiding member 10a, and a light emission part 20b from which the image light GL guided by the light-guiding member 10a is emitted to the outside.

The light-guiding member 10a includes a first surface S11, a second surface S12, a third surface S13, a fourth surface S14, and a fifth surface S15 in this order from the emission side. The first surface S11 and the third surface S13 are surfaces parallel to the xy plane, and the second surface S12, the fourth surface S14, and the fifth surface S15 are free curved surfaces. Among them, the first surface S11, the third surface S13, and the fourth surface S14 are total reflection surfaces that propagate the image light GL by reflecting the image light GL on the inner surface. The second surface S12 has a shape that is asymmetric about an optical axis AX in a transverse cross section parallel to the xz plane through which the optical axis AX passes, and has a symmetrical shape about the optical axis AX in a predetermined longitudinal cross section perpendicular to the transverse cross section. On the second surface S12, a half mirror 15 having a similar shape is formed. The fourth surface S14 has a shape that is asymmetric about the optical axis AX in a transverse cross section parallel to the xz plane through which the optical axis AX passes, and has a symmetrical shape about the optical axis AX in a predetermined longitudinal cross section perpendicular to the transverse cross section. The fifth surface S15 has a shape that is asymmetric about the optical axis AX in a transverse cross section parallel to the xz plane through which the optical axis AX passes, and has a symmetrical shape about the optical axis AX in a predetermined longitudinal cross section perpendicular to the transverse cross section. On the fifth surface S15, a reflective film RM having a similar shape is formed. The first surface S11, the third surface S13, and the fourth surface S14 are exposed to the outside for the purpose of achieving see-through viewing.

The light transmission part 50a includes a first transmission surface S51 disposed on an extension of the first surface S11 of the light-guiding member 10a, a second transmission surface S52 disposed opposite second transmission surface S52 in close proximity to the second surface S12, and a third transmission surface S53 disposed on an extension of the third surface S13. The first transmission surface S51 and the third transmission surface S53 are flat surfaces, and the second transmission surface S52 is a free curved surface. The second transmission surface S52 is disposed near the second surface S12 of the light-guiding member 10a or the half mirror 15 with the optically transparent adhesive layer CC therebetween. The first transmission surface S51 and the third transmission surface S53 are exposed to the outside for the purpose of achieving see-through viewing.

The body member 10s of the light-guiding member 10a is formed of a resin material with high optical transparency in a visible range and is molded, for example, by pouring a thermoplastic resin into a mold and curing the resin. The same applies to the light transmission part 50a or the central member 50, and the body member 50s is formed of the same material as that of the body member 10s of the light-guiding member 10a. In the first light-guiding device 21, the first surface S11 and the first transmission surface S51 are optical surfaces formed as a part of the surface of the first light-guiding device 21, and correspond to the surface covered with a sheet-shaped protective member 27 with a thin adhesive layer described below therebetween. The third surface S13 and the third transmission surface S53 are optical surfaces formed as a part of the surface of the first light-guiding device 21, and correspond to the surface covered with the sheet-shaped protective member 27 with a thin adhesive layer described later therebetween. The protective member 27 functions as an exposed optical surface and functions to protect the optical surface by itself.

In the first image forming body part 105a, the display element 80 is assumed to be a display panel of an organic electro-luminescence (EL), but the present disclosure is not limited thereto, and may be a panel for a liquid crystal display (LCD). When a panel for an LCD is used, a compatible illumination light source is required. The projection lens 30 is composed of a plurality of lens elements, and causes the image light GL from an image formed in a display layer 81 of the display element 80 to impinge on the light incidence part 20a of the light-guiding member 10a in a predetermined scattering state. At least one optical surface constituting the projection lens 30 is a free curved surface. The free curved surface constituting the projection lens 30 has a shape that is asymmetric about the optical axis AX in a transverse cross section parallel to the xz plane through which the optical axis AX passes, and has a symmetrical shape about the optical axis AX in a longitudinal cross section, which is perpendicular to the transverse cross section and through which the optical axis AX passes. Thus, the image forming characteristics differ between the two longitudinal and transverse directions.

An overview of optical paths of the image light GL is described below. The light-guiding member 10a guides, toward the eye of the wearer US, the image light GL emitted from the projection lens 30 through reflection on the first to fifth surfaces S11 to S15 and the like. Specifically, the image light GL from the projection lens 30 first impinges on the fourth surface S14 formed in the light incidence part 20a so as to be reflected by the fifth surface S15, which is an inner surface of the reflective film RM, and the image light GL again internally impinges on the fourth surface S14 so as to be totally reflected. Then, the image light GL impinges on the third surface S13 so as to be totally reflected, and impinges on the first surface S11 so as to be totally reflected. The image light GL totally reflected by the first surface S11 impinges on the second surface S12 so as to be partially reflected by the half mirror 15 provided in the second surface S12 while partially passing therethrough, and again impinges on and passes through the part of the first surface S11 formed in the light emission part 20b. The image light GL that has passed through the first surface S11 enters an eye position EP where the eye of the wearer US is located as a substantially parallel luminous flux. In other words, the wearer US observes the image as a virtual image with the image light GL.

The first virtual image forming optical part 101a achieves visual recognition of image light by the wearer US with the light-guiding member 10a, and also achieves observation of an external image with little distortion by the wearer US in the state where the light-guiding member 10a and the light transmission part 50a are combined. At this time, since the third surface S13 and the first surface S11 are substantially parallel to each other (diopter is approximately 0), the light-guiding member 10a causes almost no aberration or the like for the external light. In addition, in the light transmission part 50a, the third transmission surface S53 and the first transmission surface S11 are surfaces that are substantially parallel to each other, and the third transmission surface S53 and the first surface S11 are substantially parallel to each other, and thus, the light transmission part 50a causes almost no aberration or the like. In the above-described manner, the wearer US can observe the external image that has no distortion through the light-guiding member 10a and the light transmission part 50a.

Figure 4:
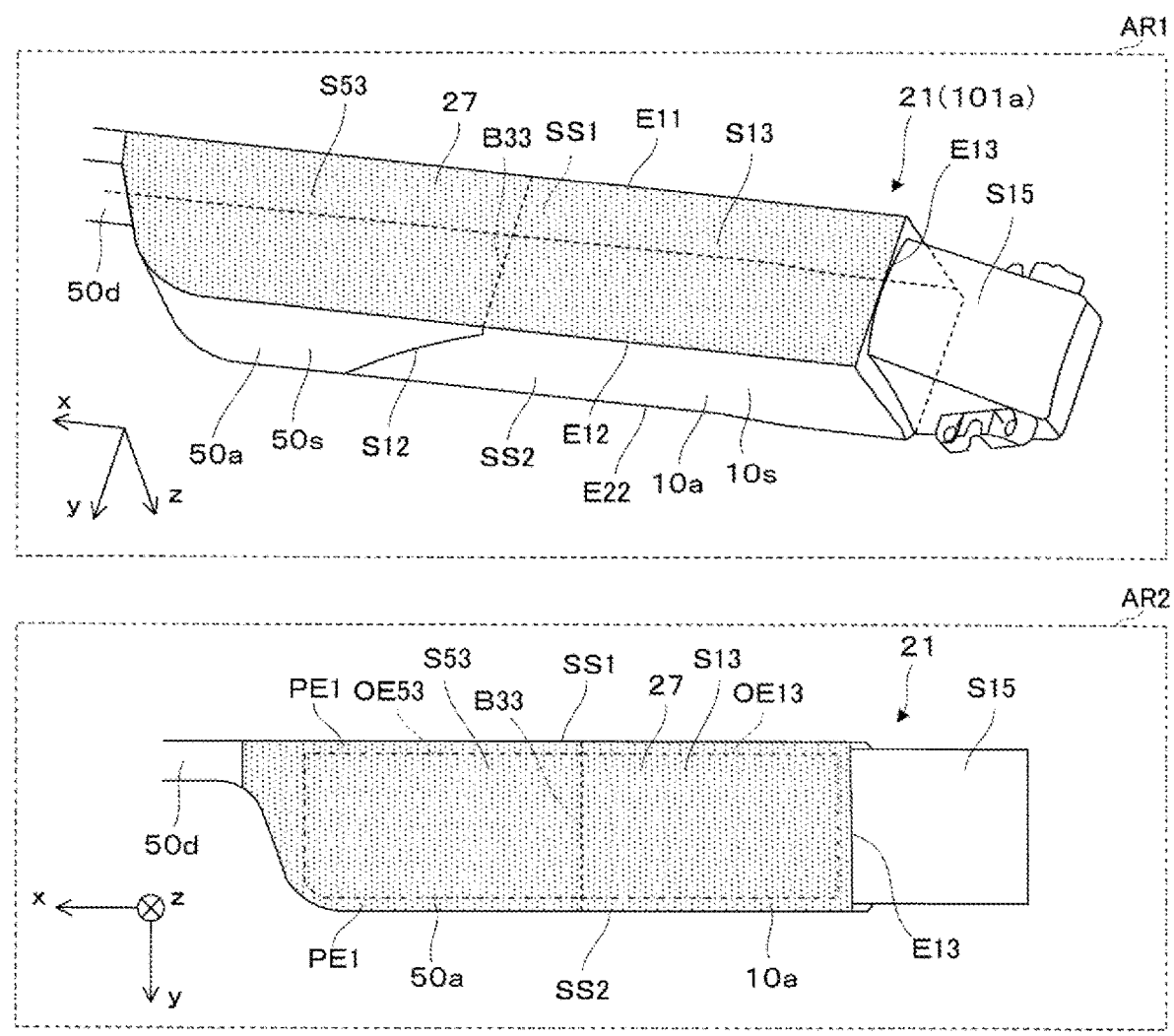
FIG. 4 is a perspective view and a conceptual front view illustrating a front side of a light-guiding device.

With reference to FIG. 4, an arrangement of the protective member 27 formed on the front side of the first light-guiding device 21, i.e., the first virtual image forming optical part 101a is described. In FIG. 4, a first region AR1 is a perspective view of the front side of the first light-guiding device 21, and a second region Ar2 is a schematic front view of the first light-guiding device 21. The sheet-shaped protective member 27 is formed to cover the body members 10s and 50s in a region corresponding to the third surface S13 and the third transmission surface S53, which are optical surfaces of the surface of the first light-guiding device 21. As a result, the protective member 27 covers substantially the entire exposed portion of the front side of the first light-guiding device 21. Note that the protective member 27 is extended in a region corresponding to the region of a dot pattern indicating an adhesive layer described later. The protective member 27 continuously covers a boundary B33 between the light-guiding member 10a and the light transmission part 50a. The boundary B33 corresponds to the boundary between the third surface S13 and the third transmission surface S53.

The protective member 27 is bonded to cover both the light-guiding member 10a and the light transmission part 50a and form the third surface S13 and the third transmission surface S53. The protective member 27 extends to edges E11 and E12 at the boundaries with an upper surface SS1 and a lower surface SS2 adjacent to the third surface S13 and the third transmission surface S53 in the vertical direction. The protective member 27 extends to an edge E13 formed between it and the fifth surface S15 on the left end side (the right side in the drawing). The protective member 27 extends to the bridge part 50d on the central side (the left side on the drawing). As a result, the protective member 27 covers an optically effective region OE13 of the third surface S13 and an optically effective region OE53 of the third transmission surface S53. The optically effective regions OE13 and OE53 are regions where the image light GL is guided or the external light OL is allowed to pass through, and are regions where the optical surface accuracy is required in terms of the image forming performance and the like. A peripheral region PE1 outside the optically effective regions OE13 and OE53 does not require the optical surface accuracy, but is a relatively smooth surface located on a plane extended from the optically effective regions OE13 and OE53.

Figure 5:
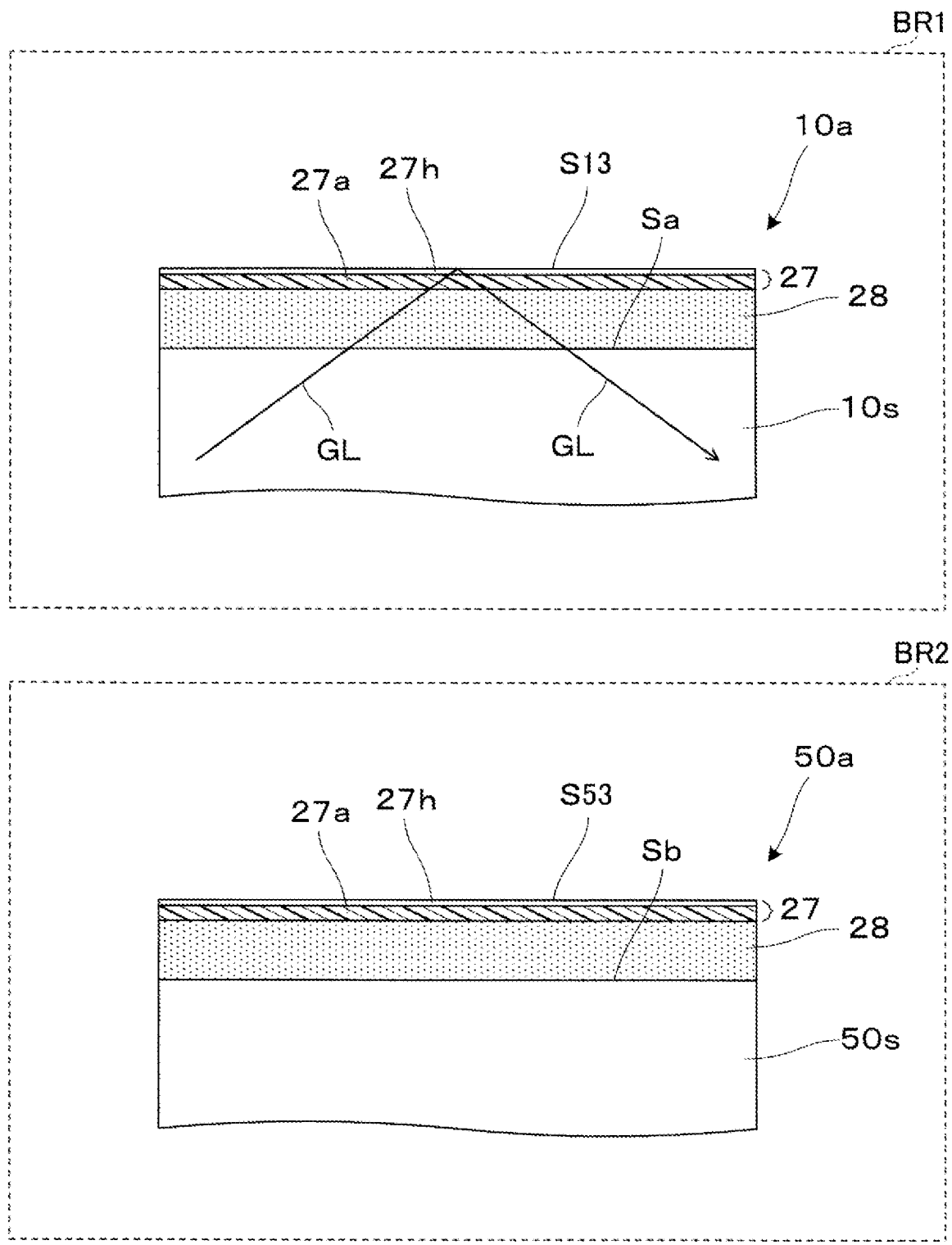
FIG. 5 is a partially enlarged cross-sectional view illustrating a structure of a light-guiding device.

FIG. 5 is a diagram illustrating a cross-sectional structure on the front surface side of the first light-guiding device 21. In FIG. 5, a first region BR1 is a cross-sectional view illustrating a surface layer structure of the light-guiding member 10a, and a second region BR2 is a cross-sectional view illustrating a surface layer structure of the light transmission part 50a. In the light-guiding member 10a, an adhesive layer 28 and the protective member 27 are layered on a surface Sa of the body member 10s. Likewise, in the light transmission part 50a, the adhesive layer 28 and the protective member 27 are layered on a surface Sb of the body member 50s. As a result, the adhesive layer 28 is uniformly formed between the body member 10s or the body member 50s and the protective member 27 covering the body member 10s or the body member 50s. In other words, the adhesive layer 28 is formed so as to fill the portion between the body members 10s and 50s and the protective member 27. In this case, the body members 10s and 50s can be protected by the adhesive layer 28 and the protective member 27. The adhesive layer 28 is an elastic member that is restored to the original shape in the state where no external force is applied thereto. The adhesive layer 28 receives an impact externally applied to the protective member 27 or other external force by elastic deformation. In this manner, damage to the protective member 27, and damage to the third surface S13 and the third transmission surface S53 can be suppressed. Since the adhesive layer 28 is restored to the original shape in the state where no external force is applied, it is possible to maintain the position of the protective member 27 in the first light-guiding device 21 to an initial state, and it is easy to maintain the optical performance of the first light-guiding device 21. Further, the adhesive layer 28 prevents an impact externally applied to the protective member 27 from reaching the body members 10s and 50s, and thus prevents the shape deterioration of the body members 10s and 50s. The image light GL propagating inside the body member 10s is reflected by the third surface S13 on the front side of the protective member 27, which is maintained to its shape unless an external force is applied and is restored to the original shape when application of an external force is stopped. Then, the image light GL internally impinges on the next optical surface (not illustrated). Note that the external light OL is refracted by the third surface S13 or the first transmission surface S51 and passes through it.

In the light-guiding member 10a and the light transmission part 50a, a hard coat layer 27h is formed on the surface of the protective member 27. Specifically, the hard coat layer 27h is provided on a body layer 27a of the protective member 27. The hard coat layer 27h performs a role of preventing deterioration of the protective member 27 against scratching and other external actions. The protective member 27 and the adhesive layer 28 have a uniform thickness over the entirety including the light-guiding member 10a and the light transmission part 50a. With the protective member 27 and the adhesive layer 28 having a uniform thickness, an image formation accurately reflecting the shape of the body member 10s can be achieved, and the optical performance of the light-guiding member 10a can be easily ensured, and thus, degradation of the displayed image can be suppressed. The numerical values of the thickness of the protective member 27 and the adhesive layer 28 is not limited; however, if the protective member 27 is excessively thin, the protection function of the protective member 27 is limited, and the shape of the protective member 27 cannot be easily maintained when the protective member 27 is bonded to the light-guiding member 10a. In addition, if the adhesive layer 28 is excessively thin, the peeling prevention function of the protective member 27 is not easily achieved, and the protection function for elastically supporting the protective member 27 and allowing deflection deformation of the protective member 27 is limited. If the adhesive layer 28 and the protective member 27 are thin, an interference pattern may be formed in the case where there is a difference in refractive index. From this viewpoint, it is also desirable that the adhesive layer 28 and the protective member 27 be thick to a certain degree. On the other hand, if the protective member 27 is excessively thick, the ease of deflection deformation is reduced, and the protective member 27 is easily damaged by external forces. In addition, if the adhesive layer 28 is excessively thick, it is not easy to precisely maintain the distance between the protective member 27 and the light-guiding member 10a and the like, and the protective member 27 can be easily deformed by a slight external force. In addition, the ease of maintenance of the shape and arrangement after the protective member 27 is bonded to the light-guiding member 10a and the like is reduced. In an actual prototype example, various materials were selected such that the sum of the protective member 27 and the adhesive layer 28 is 0.1 mm or less to make them as thin as possible. The refractive indexes of the protective member 27 and the adhesive layer 28 are desirably equal to the refractive index of the body member 10s in order to prevent the occurrence of ghosts and interference patterns, but some difference in refractive index is allowable. When the body member 10s, the protective member 27, and the adhesive layer 28 have the same refractive index, it is easy to cause total reflection only on the outer surface side of the protective member 27, and the occurrence of interference and wavefront disturbance can be reduced. Here, the case where the refractive index of the protective member 27 or the like is equal to the light-guiding member 10a and the light transmission part 50a is not limited to a case where the refractive indexes are exactly equal to each other, and includes a case where the refractive index differs by approximately 5%. The elastic modulus of the adhesive layer 28 is desirably approximately $1\times10^3$ Pa or greater at room temperature or in a use environment in order to support the protective member 27 while suppressing displacement of the protective member 27 by preventing the flow of the adhesive layer 28. In addition, the elastic modulus of the adhesive layer 28 is desirably approximately $1\times10^6$ Pa or lower at room temperature or in a use environment in order to elastically support the protective member 27 by deforming the adhesive layer 28 in accordance with the external force. The elastic modulus of the protective member 27 is greater than the elastic modulus of the adhesive layer 28, and is approximately $1\times0^6$ Pa or greater.

The material of the body member 10s and the body member 50s may be a cycloolefin polymer (COP) resin, for example. The body member 10s and the body member 50s are formed by injection molding with the material resin. The material of the body layer 27a of the protective member 27 may be a cycloolefin polymer (COP) resin, an acrylic resin, a polycarbonate resin, or the like, for example. The body layer 27a of the protective member 27 is obtained by stretching the above-mentioned resin into the form of a sheet material. The hard coat layer 27h of the protective member 27 is formed by applying a hard coat material containing an organic material and/or an inorganic material on the sheet-shaped body layer 27a by a spray or other methods, and then drying the material. At this time, when a hard coat layer with a uniform thickness is formed on a large sheet member and a large number of protective members 27 are cut out from the sheet member, the plurality of protective members 27 are collectively formed as sheet members, and thus the manufacturing cost of the protective member 27, i.e., the manufacturing cost of the first light-guiding device 21 can be reduced. The material of the adhesive layer 28 may be a urethane-based adhesive, a silicone-based adhesive, or the like, as well as an acrylic adhesive. The adhesive layer 28 may be applied to the surfaces Sa and Sb of the body member 10s and the body member 50s so as to bond the protective member 27 onto it. Alternatively, the adhesive layer 28 may be applied to the protective member 27 so as to bond the protective member 27 together with the adhesive layer 28 onto the surfaces Sa and Sb of the body member 10s and the body member 50s.

Figure 6:
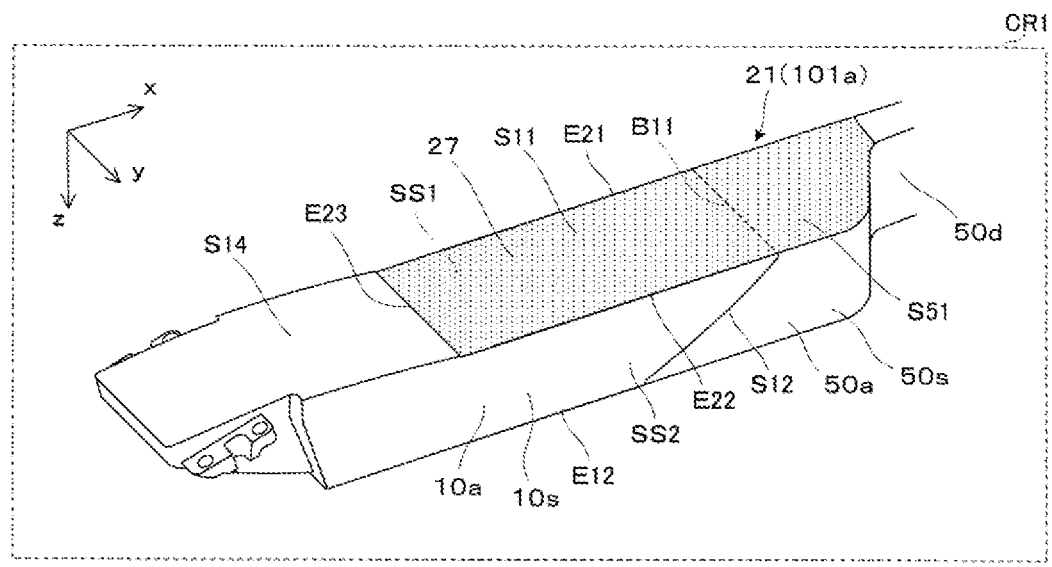
FIG. 6 is a perspective view and a conceptual back view illustrating a back side of the light-guiding device.
Figure 6:
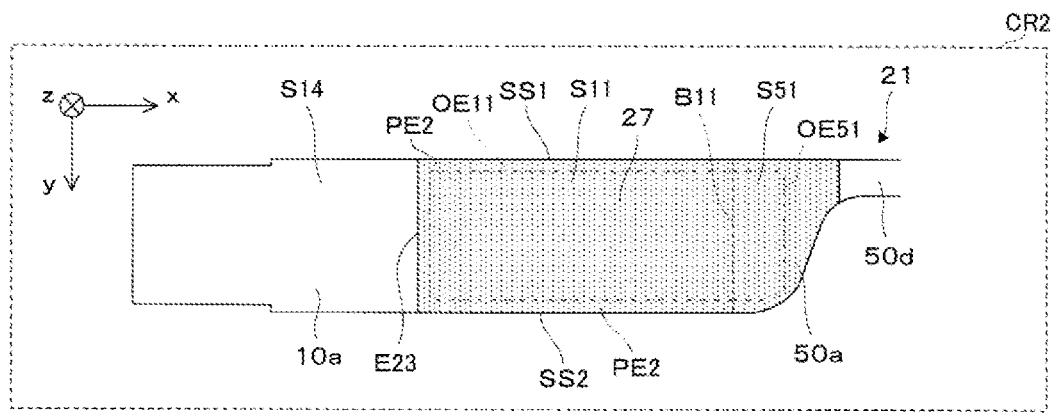

With reference to FIG. 6, an arrangement of the protective member 27 formed on the back side of the first light-guiding device 21 is described. In FIG. 6, a first region CR1 is a perspective view of the first light-guiding device 21, and a second region CR2 is a schematic back view of the first light-guiding device 21. The sheet-shaped protective member 27 is formed to cover the body members 10s and 50s in a region corresponding to the first surface S11 and the first transmission surface S51 of the surface of the first light-guiding device 21, i.e., a region that is a flat optical surface and a total reflection surface. As a result, the protective member 27 entirely covers a central portion of the exposed portion of the back side of the first light-guiding device 21. The protective member 27 continuously covers a boundary B11 between the light-guiding member 10a and the light transmission part 50a. The boundary B11 corresponds to the boundary between the first surface S11 and the first transmission surface S51.

The protective member 27 is bonded to cover both the light-guiding member 10a and the light transmission part 50a and form the first surface S11 and the first transmission surface S51. The protective member 27 extends to edges E21 and E22 at the boundaries with the upper surface SS1 and the lower surface SS2 adjacent to the first surface S11 and the first transmission surface S51 in the vertical direction. The protective member 27 extends to an edge E23 formed between it and the fourth surface S14 on the left end side (the left side in the drawing). The protective member 27 extends to the bridge part 50d on the central side (the right side on the drawing). As a result, the protective member 27 covers an optically effective region OE11 of the first surface S11 and an optically effective region OE51 of the first transmission surface S51. The optically effective regions OE11 and OE51 are regions where the image light GL is guided or the external light OL is allowed to pass through, and are regions where the optical surface accuracy is required in terms of the image forming performance and the like. A peripheral region PE2 outside the optically effective regions OE11 and OE51 does not require the optical surface accuracy, but is a relatively smooth surface located on a plane extended from the optically effective regions OE11 and OE51.

Figure 7:
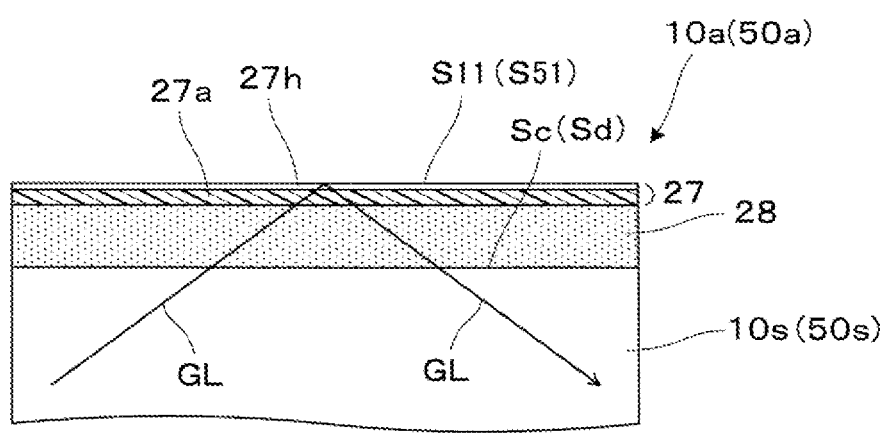
FIG. 7 is a partially enlarged cross-sectional view illustrating a structure of the light-guiding device.

FIG. 7 is a diagram illustrating a cross-sectional structure on the back surface side of the first light-guiding device 21. The adhesive layer 28 and the protective member 27 are layered on a surface Sc of the body member 10s in the light-guiding member 10a and on a surface Sd of the body member 50s in the light transmission part 50a. As a result, the adhesive layer 28 is uniformly formed between the body member 10s or the body member 50s and the protective member 27 covering the body member 10s or the body member 50s. The hard coat layer 27h is provided on the body layer 27a of the protective member 27 in the light-guiding member 10a and the light transmission part 50a. The thickness, refractive index, and elastic modulus of the protective member 27 and the adhesive layer 28 may be set as in the case of the front surface side of the first light-guiding device 21 described with reference to FIG. 5. The image light GL propagating inside the body member 10s is reflected by the first surface S11 on the back side of the protective member 27, and impinges on the next optical surface (not illustrated).

While the first light-guiding device 21 is described above, the second light-guiding device 22 has the same structure as that of the first light-guiding device 21, and the protective member 27 is bonded to cover the body members 10s and 50s with the adhesive layer 28 therebetween in the light-guiding member 10a and the light transmission part 50a.

As described above, according to the light-guiding devices 21 and 22 according to the first embodiment and the manufacturing method thereof, since the adhesive layer 28 is formed between the body members 10s and 50s and the protective member 27, the stress received by the protective member 27 is transmitted to the body member 10s through the adhesive layer 28, and the adhesive layer 28 serves as a cushioning material. Thus, damage to the protective member 27 and the body members 10s and 50s is easily suppressed, and peeling of the protective member 27 from the body members 10s and 50s can be suppressed.

Further, according to the light-guiding devices 21 and 22 according to the first embodiment, the adhesive layer 28 is formed so as to fill the portion between the body members 10s and 50s and the protective member 27, and thus the body members 10s and 50s can be protected by the adhesive layer 28 and the protective member 27. The adhesive layer 28 receives the impact externally applied to the protective member 27 and other external force by deformation. In this manner, damage to the protective member 27 and the body members 10s and 50s can be suppressed. The adhesive layer 28 prevents an impact externally applied to the protective member 27 from reaching the body members 10s and 50s.

Figure 8:
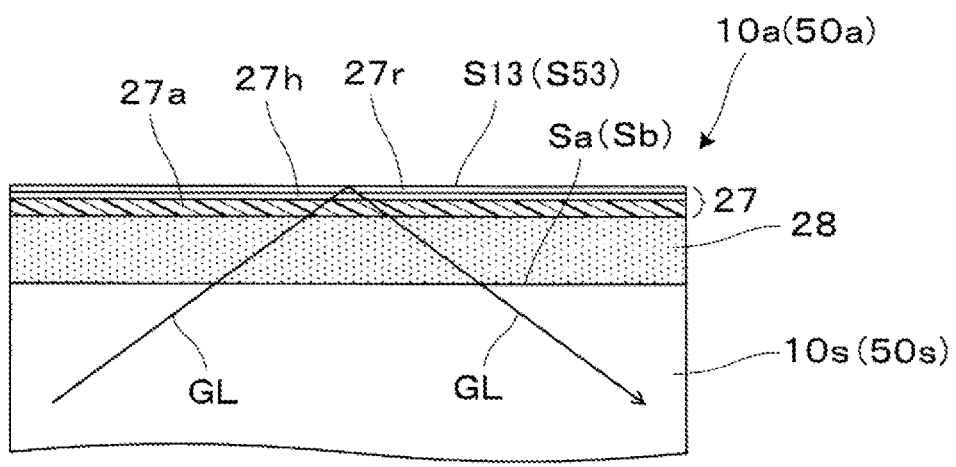
FIG. 8 is a partially enlarged cross-sectional view illustrating a modified example of the light-guiding device.

FIG. 8 is a diagram illustrating a modified example of the cross-sectional structure of the first light-guiding device 21. In this case, an anti-reflection film 27r is formed on the hard coat layer 27h as the outermost layer of the protective member 27. The anti-reflection film 27r is formed by laminating inorganic material layers having high and low refractive indexes. Note that, although the description is omitted, the same anti-reflection film may be formed on the hard coat layer 27h in the second light-guiding device 22.

Second Embodiment

A light-guiding device and a display device according to a second embodiment are described below with reference to FIGS. 9 to 12. Note that the light-guiding device and the display device of the second embodiment are obtained by partially modifying the light-guiding device and the like of the first embodiment, and therefore description of the common parts is omitted.

Figure 9:
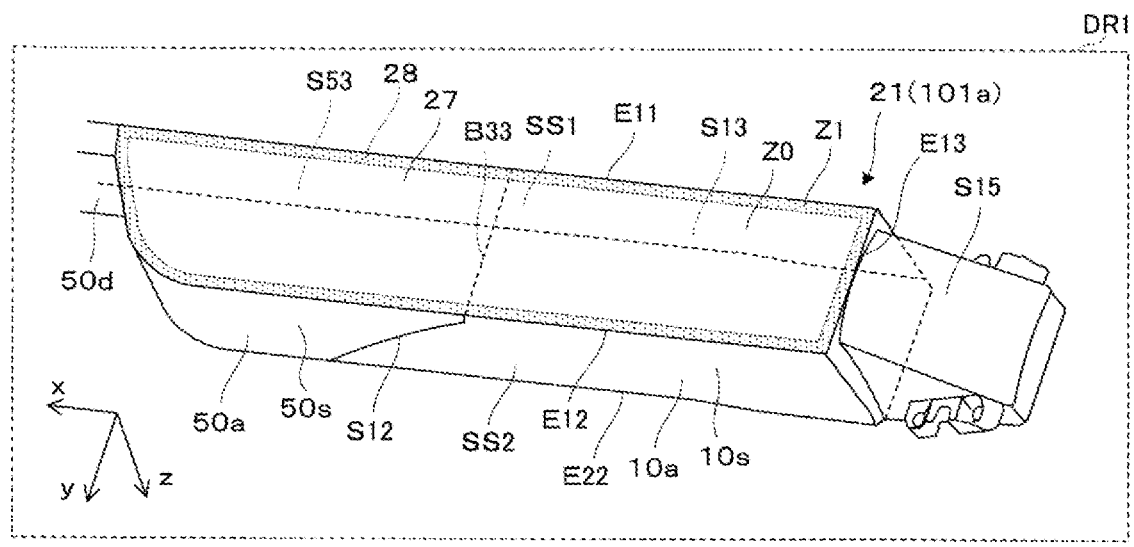
FIG. 9 is a perspective view and a conceptual front view illustrating a front side of a display device of a second embodiment.
Figure 9:
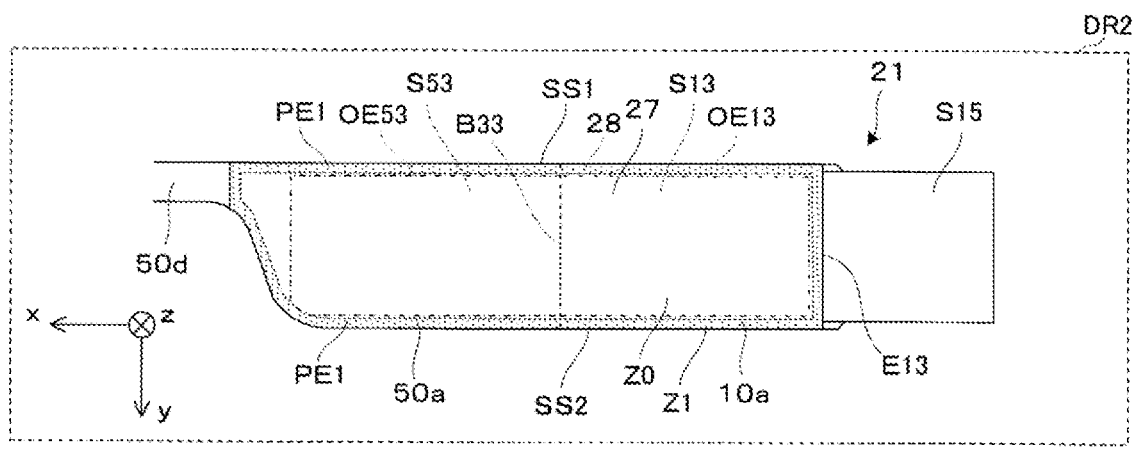

An arrangement of the protective member 27 formed on the front side of the first light-guiding device 21 is described with reference to FIG. 9. In FIG. 9, a first region DR1 is a perspective view of the first light-guiding device 21, and a second region DR2 is a schematic front view of the first light-guiding device 21. The sheet-shaped protective member 27 is formed to cover the body members 10s and 50s in a region corresponding to the third surface S13 and the third transmission surface S53, which are optical surfaces of the surface of the first light-guiding device 21. As a result, the protective member 27 covers substantially the entire exposed portion of the front side of the first light-guiding device 21. The protective member 27 covers the boundary B33 between the light-guiding member 10a and the light transmission part 50a.

The protective member 27 is supported on the surfaces of the light-guiding member 10a and the light transmission part 50a with the adhesive layer 28 formed in a frame shape therebetween, and covers the third surface S13 formed in the light-guiding member 10a and the third transmission surface S53 formed in the light transmission part 50a. The protective member 27 extends to edges E11 and E12 at the boundaries with an upper surface SS1 and a lower surface SS2 adjacent to the third surface S13 and the third transmission surface S53 in the vertical direction. The protective member 27 extends to an edge E13 formed between it and the fifth surface S15 on the left end side (the right side in the drawing). The protective member 27 extends to the bridge part 50d on the central side (the left side on the drawing). As a result, the protective member 27 covers an optically effective region OE13 of the third surface S13 and an optically effective region OE53 of the third transmission surface S53. A support region Z1 that forms the adhesive layer 28 is provided in the peripheral region PE1 outside the optically effective regions OE13 and OE53. An aperture region Z0 is provided inside the support region Z1. The aperture region Z0 substantially corresponds to the optically effective regions OE13 and OE53, but may be wider than this.

The third surface S13 and the third transmission surface S53 are flat surfaces. In other words, the protective member 27 is disposed opposite the third surface S13 and the third transmission surface S53, which are optical surfaces of the body members 10s and 50s. In this case, the protective member 27 in a thin sheet shape can be disposed near the third surface S13 and the third transmission surface S53, and it is easy to dispose the protective member 27 and to maintain the optical performance of the first light-guiding device 21.

Figure 10:
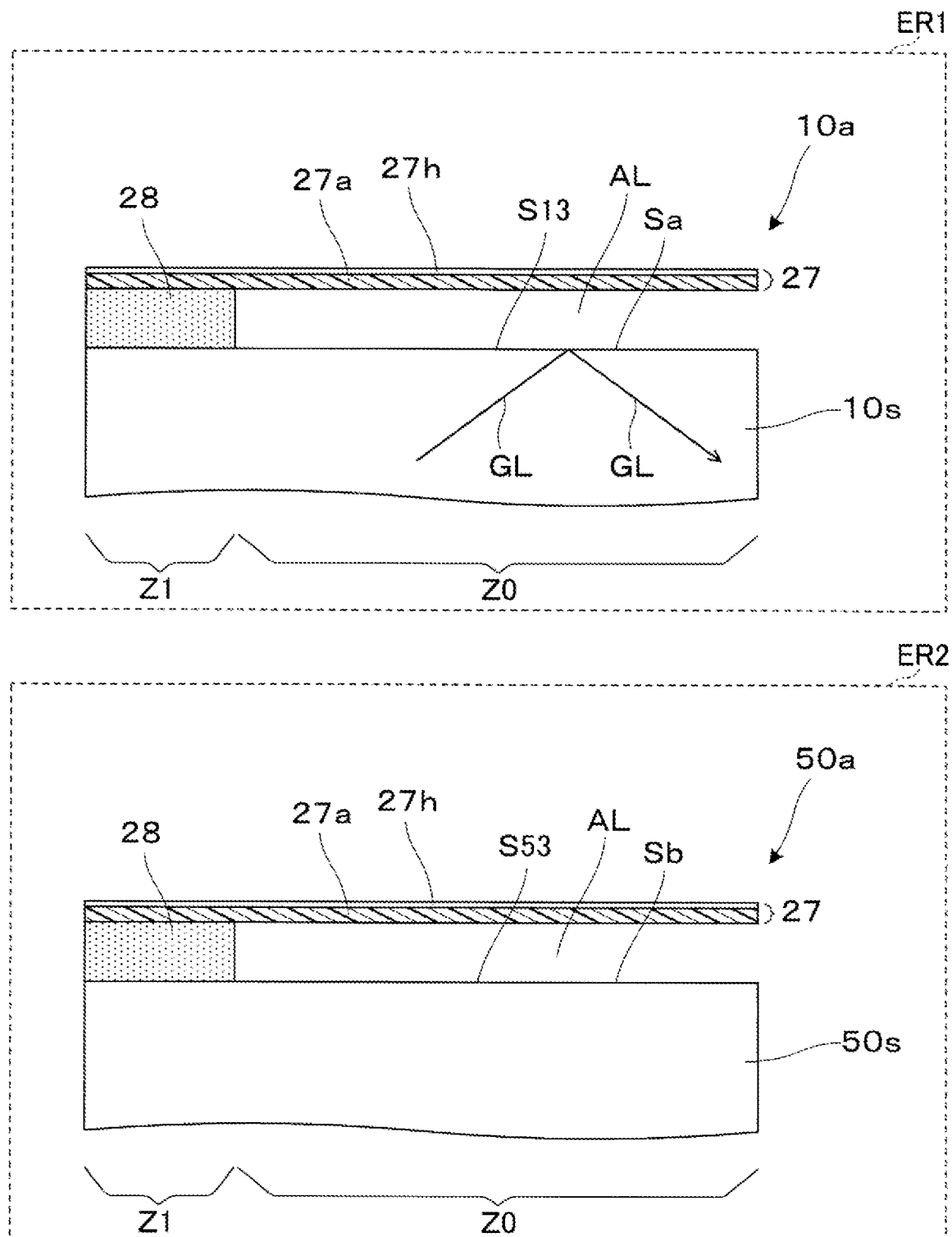
FIG. 10 is a partially enlarged cross-sectional view illustrating a structure of a light-guiding device.

FIG. 10 is a diagram illustrating a cross-sectional structure on the front surface side of the first light-guiding device 21. In FIG. 10, a first region ER1 is a cross-sectional view illustrating a surface layer structure of the light-guiding member 10a, and a second region ER2 is a cross-sectional view illustrating a surface layer structure of the light transmission part 50a. In the aperture region Z0 in the light-guiding member 10a, an air layer AL is formed between the surface Sa of the body member 10s and the protective member 27, and the surface Sa of the body member 10s functions as the third surface S13 that totally reflects the image light GL. In the support region Z1, the adhesive layer 28 and the protective member 27 are layered on the surface Sa of the body member 10s. Likewise, in the aperture region Z0 in the light transmission part 50a, the air layer AL is formed between the surface Sb of the body member 50s and the protective member 27, and the surface Sb of the body member 50s functions as the third transmission surface S53 that allows the external light OL to pass therethrough. In the support region Z1, the adhesive layer 28 and the protective member 27 are layered on the surface Sb of the body member 50s.

In this case, the adhesive layer 28 is formed in a frame shape along the outer edge of the protective member 27 to keep the space between the body members 10s and 50s and the protective member 27 airtight, and form the air layer AL. In this case, not only the adhesive layer 28, but also the air layer AL between the body members 10s and 50s and the protective member 27 serves as a cushioning material to mitigate the impact or other external force on the protective member 27, and damage to the third surface S13 and the third transmission surface S53, which are optical surfaces, can be suppressed.

In the light-guiding member 10a and the light transmission part 50a, the hard coat layer 27h is formed on the surface of the protective member 27. The protective member 27 has a uniform thickness over the entirety including the light-guiding member 10a and the light transmission part 50a. The adhesive layer 28 also has a uniform thickness in the support region Z1. The thickness values of the protective member 27 and the adhesive layer 28 are not limited, but if the protective member 27 is excessively thin, the protection function of the protective member 27 is limited. In addition, when the adhesive layer 28 is excessively thin, the peeling prevention function of the protective member 27 is not easily achieved, and the protection function of elastically supporting the protective member 27 is limited. If the adhesive layer 28 and the protective member 27 are thin, an interference pattern may be formed in the case where there is a difference in refractive index. From this viewpoint, it is also desirable that the adhesive layer 28 and the protective member 27 be thick to a certain degree. On the other hand, if the protective member 27 is excessively thick, the ease of deflection deformation is reduced, and the protective member 27 is easily damaged by external forces. In addition, if the adhesive layer 28 is excessively thick, the protective member 27 may be easily displaced by a slight external force and the support may become unstable. The refractive indexes of the protective member 27 and the adhesive layer 28 may be set to any values because they are not located on the optical path of the image light GL. The elastic modulus of the adhesive layer 28 is desirably not less than approximately $1\times10^3$ Pa at room temperature or in a use environment in order to prevent flow, and the elastic modulus of the adhesive layer 28 is desirably not less than approximately $1\times10^6$ Pa at room temperature or in a use environment in order to enable elastic support of the protective member 27. The elastic modulus of the protective member 27 is greater than the elastic modulus of the adhesive layer 28, and is approximately $1\times10^6$ Pa or greater.

The material of the body member 10s and the body member 50s may be a cycloolefin polymer (COP) resin, for example. The body member 10s and the body member 50s are formed by injection molding with the material resin. The material of the body layer 27a of the protective member 27 may be a cycloolefin polymer (COP) resin, an acrylic resin, a polycarbonate resin, or the like, for example. The body layer 27a of the protective member 27 is obtained by stretching the above-mentioned resin into the form of a sheet material. The hard coat layer 27h of the protective member 27 is formed by applying a hard coat material containing an organic material and/or an inorganic material on the sheet-shaped body layer 27a by a spray or other methods, and then drying the material. The material of the adhesive layer 28 may be a urethane-based adhesive, a silicone-based adhesive, or the like, as well as an acrylic adhesive. The adhesive layer 28 may be applied to the support region Z1 of the surfaces Sa and Sb of the body member 10s and the body member 50s so as to bond the protective member 27 onto it. Alternatively, the adhesive layer 28 may be applied to an appropriate portion of the protective member 27 so as to bond the protective member 27 together with the adhesive layer 28 onto the surfaces Sa and Sb of the body member 10s and the body member 50s.

Figure 11:
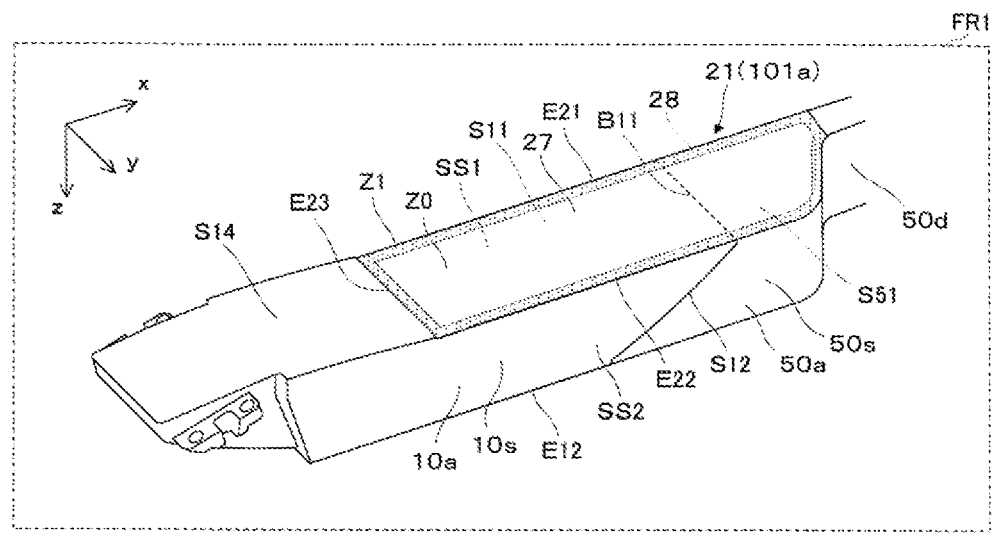
FIG. 11 is a perspective view and a conceptual back view illustrating a back side of the display device.
Figure 11:
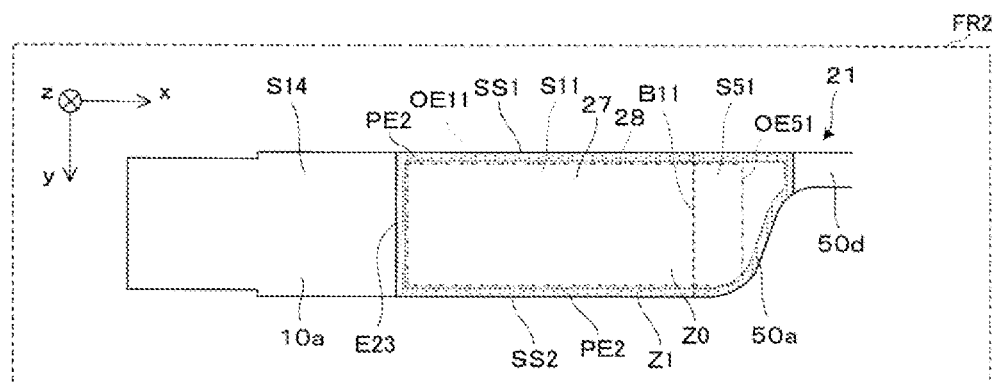

With reference to FIG. 11, an arrangement of the protective member 27 formed on the back side of the first light-guiding device 21 is described. In FIG. 11, a first region FR1 is a perspective view of the first light-guiding device 21, and a second region FR2 is a schematic back view of the first light-guiding device 21. The sheet-shaped protective member 27 is formed to cover the body members 10s and 50s in a region corresponding to the first surface S11 and the first transmission surface S51, which are optical surfaces of the surface of the first light-guiding device 21. As a result, the protective member 27 entirely covers a central portion of the exposed portion of the back side of the first light-guiding device 21. The protective member 27 covers the boundary B11 between the light-guiding member 10a and the light transmission part 50a.

The protective member 27 is supported on the surfaces of the light-guiding member 10a and the light transmission part 50a with the adhesive layer 28 formed in a frame shape therebetween, and covers the first surface S11 formed in the light-guiding member 10a and the first transmission surface S51 formed in the light transmission part 50a. The protective member 27 extends to the edges E21 and E22 at the boundaries with the upper surface SS1 and the lower surface SS2 adjacent to the first surface S11 and the first transmission surface S51 in the vertical direction. The protective member 27 extends to the edge E23 formed between it and the fourth surface S14 on the left end side (the left side in the drawing). The protective member 27 extends to the bridge part 50d on the central side (the right side on the drawing). As a result, the protective member 27 covers the optically effective region OE11 of the first surface S11 and the optically effective region OE51 of the first transmission surface S51. The support region Z1 that forms the adhesive layer 28 is provided in the peripheral region PE2 outside the optically effective regions OE11 and OE51. The aperture region Z0 is provided inside the support region Z1. The aperture region Z0 substantially corresponds to the optically effective regions OE11 and OE51, but may be wider than this.

Figure 12:
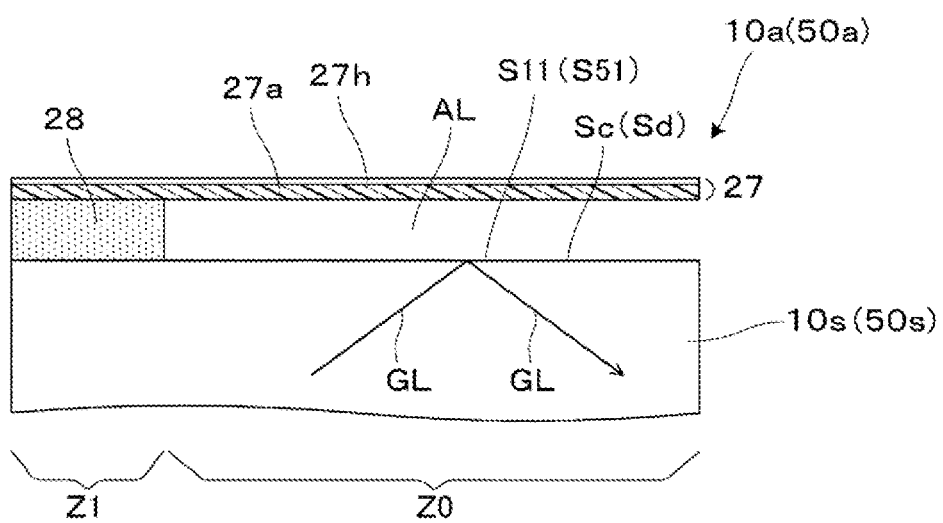
FIG. 12 is a partially enlarged cross-sectional view illustrating a structure of the light-guiding device.

FIG. 12 is a diagram illustrating a cross-sectional structure on the back surface side of the first light-guiding device 21. In the aperture region Z0 in the light-guiding member 10a and the light transmission part 50a, the air layer AL is formed between the surfaces Sc and Sd of the body members 10s and 50s and the protective member 27, and the surface Sc of the body member 10s functions as the first surface S11 that totally reflects the image light GL. The surface Sd of the body member 50s functions as the first transmission surface S51. In the support region Z1, the adhesive layer 28 and the protective member 27 are layered on the surfaces Sc and Sd of the body members 10s and 50s. The hard coat layer 27h is provided on the body layer 27a of the protective member 27 in the light-guiding member 10a and the light transmission part 50a. The thickness, refractive index, and elastic modulus of the protective member 27 and the adhesive layer 28 may be set as in the case of the front surface side of the first light-guiding device 21 described with reference to FIG. 10.

While the first light-guiding device 21 is described above, the second light-guiding device 22 has the same structure as that of the first light-guiding device 21, and the protective member 27 is bonded to cover the body members 10s and 50s with the adhesive layer 28 therebetween in the light-guiding member 10a and the light transmission part 50a.

Figure 13:
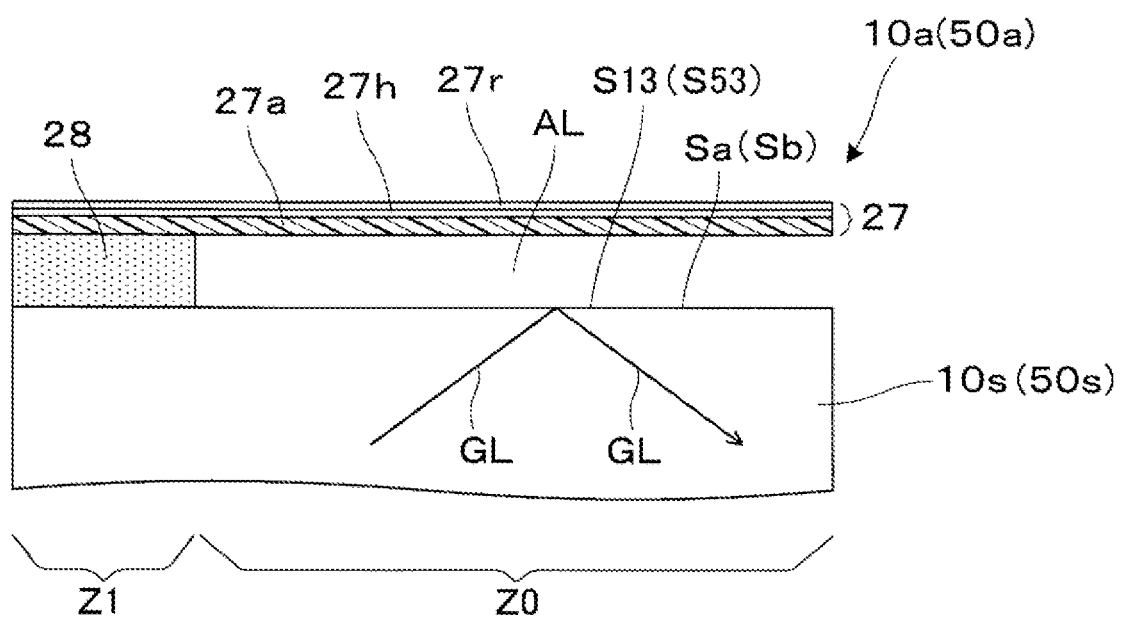
FIG. 13 is a partially enlarged cross-sectional view illustrating a modified example of the light-guiding device.

FIG. 13 is a diagram illustrating a modified example of the cross-sectional structure of the first light-guiding device 21. In this case, an anti-reflection film 27r is formed on the hard coat layer 27h as the outermost layer of the protective member 27. The anti-reflection film 27r is formed by laminating inorganic material layers having high and low refractive indexes. Note that the anti-reflection film 27r may be formed inside the protective member 27.

According to the light-guiding devices 21 and 22 according to the second embodiment, since the adhesive layer 28 is formed between the body members 10s and 50s and the protective member 27, the stress received by the protective member 27 is transmitted to the body member 10s through the adhesive layer 28, and the adhesive layer 28 serves as a cushioning material. Thus, it is easy to prevent damage to the protective member 27 and the body members 10s and 50s, and it is possible to suppress peeling of the protective member 27 from the body members 10s and 50s.

Further, according to the light-guiding devices 21 and 22 according to the second embodiment, since the adhesive layer 28 is provided outside the optically effective regions OE11, OE13, OE51 and OE53 of the light-guiding devices 21 and 22 along the outer edges of the optically effective regions OE11, OE13, OE51 and OE53, the surfaces Sa, Sb, Sc, and Sd of the body members 10s and 50s can be adjacent to the air as the optical surfaces in the optically effective regions OE11, OE13, OE51 and OE53, and thus light guidance, image formation, and see-through viewing can be achieved using the first surface S11, the third surface S13, the first transmission surface S51, and the third transmission surface S53, which are the original optical surfaces of the body members 10s and 50s.

Third Embodiment

A light-guiding device according to a third embodiment is the described below with reference to FIG. 14. Note that the light-guiding device according the third embodiment is obtained by partially modifying the light-guiding device of the first embodiment, and therefore description of the common parts is omitted.

In FIG. 14, a first region GR1 is a perspective view of the front side of the first light-guiding device 21, and a second region GR2 is a perspective view of the back side of the first light-guiding device 21. In this case, the protective member 27 includes extended parts 27e and 127e, and the extended parts 27e and 127e are fixed, with the adhesive layer 28 therebetween, to the upper surface SS1 and the lower surface SS2, which are side surfaces on which optical surfaces such as the first surfaces S11 and S13 are not formed in the body members 10s and 50s.

According to the light-guiding devices 21 and 22 according to the third embodiment, since the protective member 27 is fixed to the upper surface SS1 and the lower surface SS2, which are side surfaces where the optical surface is not formed in the body members 10s and 50s, the protective member 27 can be easily fixed and the protective member 27 can be stabilized.

Fourth Embodiment

A light-guiding device according to a fourth embodiment is the described below with reference to FIG. 15. Note that the light-guiding device according the fourth embodiment is obtained by partially modifying the light-guiding device of the first embodiment, and therefore description of the common parts is omitted.

With reference to FIG. 15, in the first light-guiding device 21 or the light-guiding member 10a, a sheet-shaped protective member 127 is additionally provided to cover the fourth surface S14 of the body member 10s. As a result, the protective members 27 and 127 cover substantially the entire exposed portion of the back side of the first light-guiding device 21, and the adhesive layer 128 supporting the protective member 127 is formed outside an optically effective region OE14 of the fourth surface S14. Here, the protective member 127 is supported by the light-guiding member 10a with the adhesive layer 128 therebetween at the outer peripheral portion. The protective member 127 has some thickness and is capable of maintaining a three-dimensional curved shape, and, elastically deforms when an external force is applied thereto. In other words, a thin air layer is formed between the protective member 127 and the fourth surface S14 of the light-guiding member 10a, thus allowing for elastic deformation of the protective member 127. The adhesive layers 28 and 128 have a function of preventing peeling of the protective members 27 and 127.

Variations and Other Matters

While the display element 80 is an organic EL display panel or a panel for an LCD in the description above, the display element 80 may be a self-luminous display element represented by an LED array, a laser array, a quantum dot light-emitting element, and the like. Further, the display element 80 may be a display using a laser scanner composed of a combination of a laser light source and a scanner. Note that a liquid crystal on silicon (LCOS) technique may be used instead of an LCD panel.

While the light from the first image forming body part 105a or the second image forming body part 105b is guided to the front of the eye by propagating the light in the lateral direction by the light-guiding member 10a in the description above, the light may be guided in the vertical direction. In this case, the first image forming body part 105a or the second image forming body part 105b are disposed on the obliquely upper side or the obliquely lower side of the front of the of the eye, and light from the first image forming body part 105a or the second image forming body part 105b is guided to the front of the eye by propagating the light in the vertical direction by the light-guiding member. Here, while the first virtual image forming optical part 101a and the second virtual image forming optical part 101b have optical surfaces corresponding to the light-guiding direction, the protective member 27 forming and covering the optical surface can be supported on the body members 10s and 50s with the adhesive layer 28 therebetween.

While the display device 100 is a head-mounted display (HMD) for both eyes in the above description, the display device 100 may be a wearable display for a single eye. In this case, the display device 100 is fixed to, for example, an eyeglass frame or a dedicated frame, and includes a part corresponding to the first display devices 100A on one side and a part that fixes the part corresponding to the first display device 100A to the eyeglass frame or the like.

A light-guiding device according to a specific aspect is configured to accept image light through a light incidence part, guide the image light through reflection, and emit, to outside through a light emission part, the image light that is guided, the light-guiding device including a protective member having a sheet shape and configured to cover a body member in a region corresponding to an optical surface of a surface of the light-guiding device. An adhesive layer is formed between the body member and the protective member.

In the above-described light-guiding device, since the adhesive layer is formed between the body member and the protective member, the stress received by the protective member is transmitted to the body member through the adhesive layer, and the adhesive layer serves as a cushioning material. Thus, damage to the protective member and the body member is easily suppressed, and peeling of the protective member from the body member can be suppressed.

In a specific aspect, the protective member is provided in a region corresponding to a total reflection surface of the optical surface. In such a device, the total reflection surface can be formed by the protective member or the total reflection surface can be covered and protected by the protective member.

In another specific aspect, the adhesive layer is formed to fill a portion between the body member and the protective member. In this case, the body member can be protected by the adhesive layer and the protective member. The adhesive layer receives the impact externally applied to the protective member and other external force by deformation. In this manner, damage to the protective member can be suppressed. In addition, the adhesive layer prevents an impact externally applied to the protective member from reaching the body member.

In another specific aspect, the body member, the adhesive layer, and the protective member have the same refractive index. In this case, it is easy to cause total reflection only on the outer surface side of the protective member, and occurrence of interference and wavefront disturbance can be reduced.

In another specific aspect, the adhesive layer has a uniform thickness in the region corresponding to the optical surface. In this case, image formation accurately reflecting the shape of the body member can be achieved, and degradation of the displayed image can be suppressed.

In another specific aspect, the adhesive layer is provided outside an optically effective region of the light-guiding device along an outer edge of the optically effective region. In this case, it is possible to achieve a structure in which the surface of the body member is adjacent to the air as the optical surface in the optically effective region, and it is possible to achieve image formation and light guidance using the original optical surface of the body member.

In another specific aspect, the adhesive layer is formed in a frame shape along an outer edge of the protective member and keeps a space between the body member and the protective member airtight. In this case, not only the adhesive layer, but also the air layer between the body member and the protective member serves as a cushioning material to mitigate the impact or other external force against the protective member, and thus damage to the optical surface can be suppressed.

In another specific aspect, the protective member is disposed opposite a flat surface of the body member. In this case, the protective member in a thin sheet shape can be disposed near the flat surface of the body member, the protective member can be easily disposed, and the optical performance can be easily maintained.

In another specific aspect, the protective member is fixed to a side surface of the body member with the adhesive layer between the body member and the protective member, the side surface being a surface at which no optical surface is formed. In this case, the protective member can be easily fixed and the support of the protective member can be stabilized.

In another specific aspect, the adhesive layer is an elastic member that restores to an original shape in a state where no external force is applied. In this case, the arrangement of the protective member in the light-guiding device can be maintained in an initial state or a desired state, and the optical performance of the light-guiding device can be easily maintained.

In another specific aspect, an elastic modulus of the adhesive layer is not less than $1\times10^3$ Pa and not greater than $1\times10^6$ Pa at room temperature. Since the elastic modulus is $1\times10^3$ Pa or greater at room temperature, the protective member can be supported while suppressing the displacement of the protective member by preventing the flow of the adhesive layer. In addition, since the elastic modulus is $1\times10^6$ Pa or lower at room temperature, the protective member can be elastically supported by deforming the adhesive layer in accordance with external forces.

In another specific aspect, a hard coat layer is formed at a surface of the protective member. In this case, deterioration of the protective member can be prevented. Regarding the hard coat layer of the protective member, a plurality of protective members can be easily collectively formed as sheet members, and therefore the manufacturing cost of the protective member and the light-guiding device can be reduced. The manufacturing cost of the protective member and the light-guiding device can be reduced.

A display device according to a specific aspect includes the above-described light-guiding device, and an image forming body part configured to form the image light to be guided by the light-guiding device.

In the above-described display device, which uses the above-described light-guiding device, damage to the protective member is easily suppressed, and peeling of the protective member from the light-guiding device can be suppressed.

A method according to a specific aspect is a method of manufacturing a light-guiding device configured to guide image light through reflection, the method including disposing a protective member having a sheet shape on a body member of the light-guiding device with an adhesive layer between the body member and the protective member in a region corresponding to an optical surface of a surface of the light-guiding device.

In the method of manufacturing the light-guiding device, since the protective member having a sheet shape is disposed on the body member of the light-guiding device with the adhesive layer therebetween, the stress received by the protective member is transmitted to the body member through the adhesive layer, and the adhesive layer serves as a cushioning material. Thus, damage to the protective member and the body member is easily suppressed, and peeling of the protective member from the body member can be suppressed.

What is claimed is:

1. A light-guiding device configured to accept image light through a light incidence part, guide the image light through reflection, and emit, to outside through a light emission part, the image light that is guided, the light-guiding device comprising:
   a protective member having a sheet shape and configured to cover a body member in a region corresponding to an optical surface of a surface of the light-guiding device, wherein
   an adhesive layer is formed between the body member and the protective member,
   wherein the adhesive layer is an elastic member that restores to an original shape in a state where no external force is applied.

2. The light-guiding device according to claim 1, wherein the protective member is provided in a region corresponding to a total reflection surface of the optical surface.

3. The light-guiding device according to claim 1, wherein the adhesive layer is formed to fill a portion between the body member and the protective member.

4. The light-guiding device according to claim 3, wherein the body member, the adhesive layer, and the protective member have the same refractive index.

5. The light-guiding device according to claim 4, wherein the adhesive layer has a thickness that is uniform in the region corresponding to the optical surface.

6. The light-guiding device according to claim 1, wherein the adhesive layer is provided outside an optically effective region of the light-guiding device along an outer edge of the optically effective region.

7. The light-guiding device according to claim 6, wherein the adhesive layer is formed in a frame shape along an outer edge of the protective member and keeps a space between the body member and the protective member airtight.

8. The light-guiding device according to claim 1, wherein the protective member is disposed opposite a flat surface of the body member.

9. A light-guiding device configured to accept image light through a light incidence part, guide the image light through reflection, and emit, to outside through a light emission part, the image light that is guided, the light-guiding device comprising:

a protective member having a sheet shape and configured to cover a body member in a region corresponding to an optical surface of a surface of the light-guiding device, wherein an adhesive layer is formed between the body member and the protective member, wherein the protective member is fixed to a side surface of the body member with the adhesive layer between the body member and the protective member, the side surface being a surface at which no optical surface is formed.

10. The light-guiding device according to claim 1, wherein an elastic modulus of the adhesive layer is not less than $1\times10^3$ Pa and not greater than $1\times10^6$ Pa at room temperature.

11. The light-guiding device according to claim 1, wherein a hard coat layer is formed at a surface of the protective member.

12. A display device comprising:
the light-guiding device according to claim 1; and
an image forming body part configured to form the image light to be guided by the light-guiding device.

13. A method of manufacturing a light-guiding device configured to guide image light through reflection, the method comprising:

disposing a protective member having a sheet shape on a body member of the light-guiding device with an adhesive layer between the body member and the protective member in a region corresponding to an optical surface of a surface of the light-guiding device, wherein the adhesive layer is an elastic member that restores to an original shape in a state where no external force is applied.

* * * * *